COUNTING AND REGISTERING RELAY CIRCUIT

Filed July 19, 1949 3 Sheets-Sheet 1

Inventor
Paul Hemminger
By
Attorney

Jan. 6, 1953 P. HEMMINGER 2,624,785

COUNTING AND REGISTERING RELAY CIRCUIT

Filed July 19, 1949 3 Sheets-Sheet 2

Inventor
Paul Hemminger
By C. R. Sofer
Attorney

Jan. 6, 1953 P. HEMMINGER 2,624,785

COUNTING AND REGISTERING RELAY CIRCUIT

Filed July 19, 1949 3 Sheets-Sheet 3

Inventor
Paul Hemminger
By C. P. Soper
Attorney

Patented Jan. 6, 1953 2,624,785

UNITED STATES PATENT OFFICE 2,624,785

COUNTING AND REGISTERING RELAY CIRCUIT

Paul Hemminger, Chicago, Ill., assignor, by mesne assignments, to Kellogg Switchboard and Supply Company, a corporation of Delaware Application July 19, 1949, Serial No. 105,558

1 Claim. (Cl. 175—320)

The present invention relates in general to code call apparatus, for use in private automatic telephone exchanges, and the object of the invention is a new and improved apparatus of this character.

The invention may be considered to be an improvement on the code call apparatus disclosed in the patent to Wallace No. 2,292,183, granted Aug. 4, 1942.

Code call apparatus comprises a special equipment provided in a private automatic exchange for the purpose of selectively signalling and setting up a talking connection to an official or other party having the service when he is absent from this office, although still on the premises served by the exchange, perhaps being detained by business in some other department of the company. Individual code call numbers are assigned to the parties who are given the special service and gongs, bells, or other signalling devices are installed, usually at a number of points, for sounding or otherwise displaying the code signals.

Upon calling a party who has code call service and obtaining no response, the calling party may dial the number assigned to the code call apparatus, adding to the number the digits of the code assigned to the wanted party. These operations extend a connection to the code call apparatus and register the wanted party's code, whereupon the apparatus automatically actuates the signalling devices to sound or display the code. The wanted party is thus notified of the call and responds by going to the nearest telephone and dialling the answering number assigned to the code call apparatus, which establishes a talking circuit to the calling party.

A feature of the invention is an all relay code call apparatus comprising relay registers on which the code digits are stored, a relay counting chain, and control circuits by means of which the single counting chain is used to set the code digit registers and subsequently to control the transmission of the code signals in accordance with the setting of the said registers.

Figure 1:
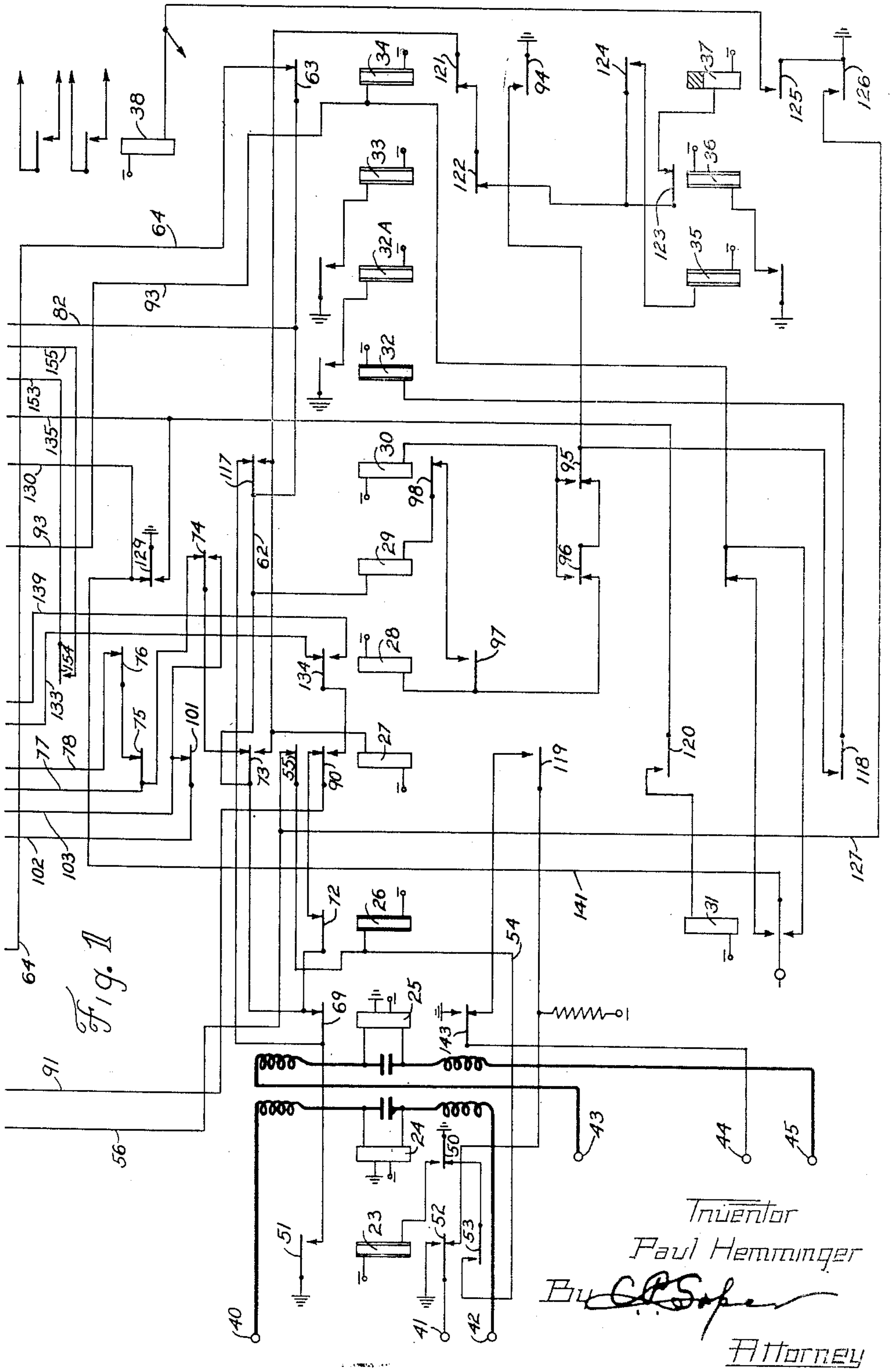
Figure 2:
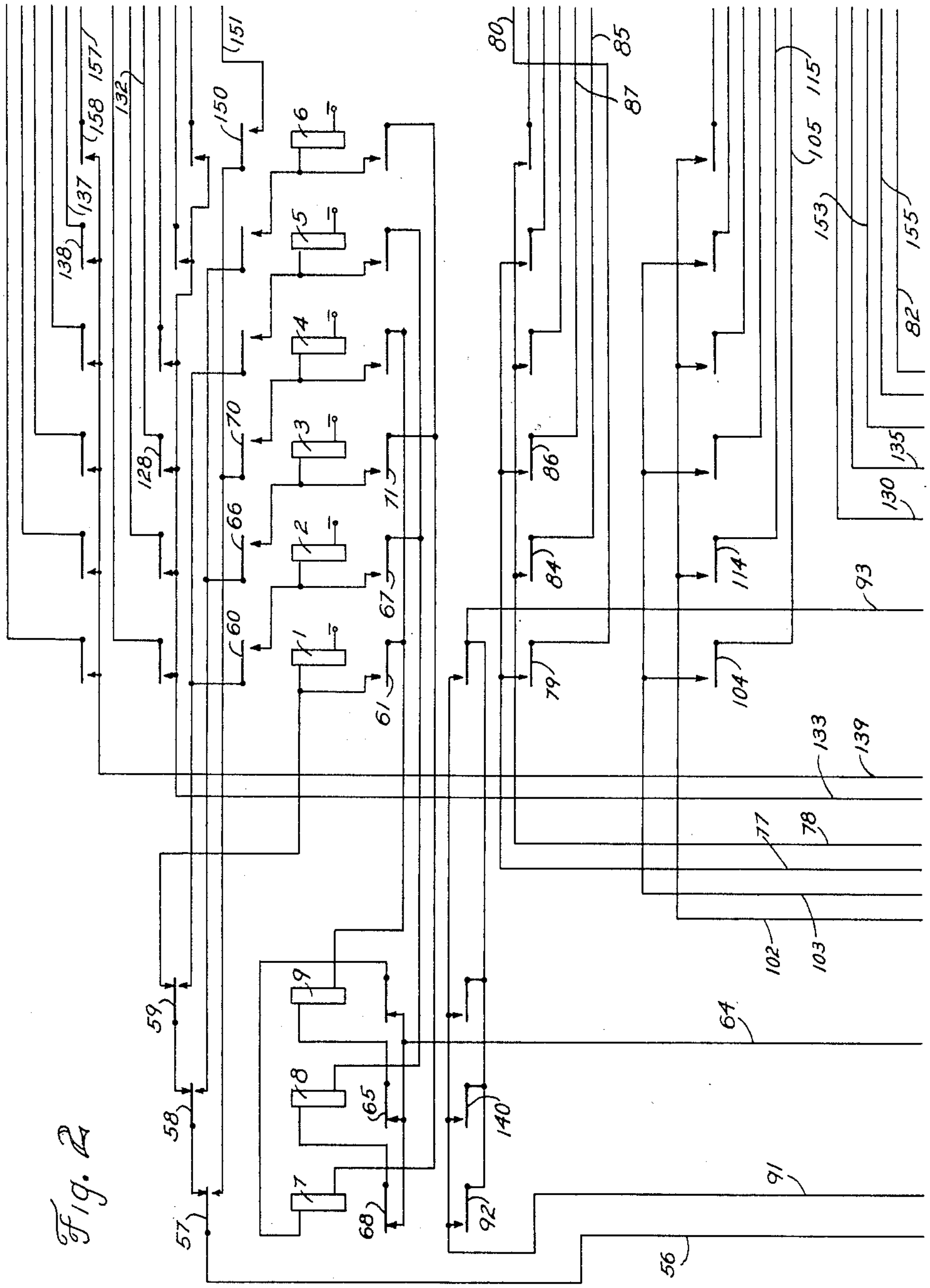
Figure 3:
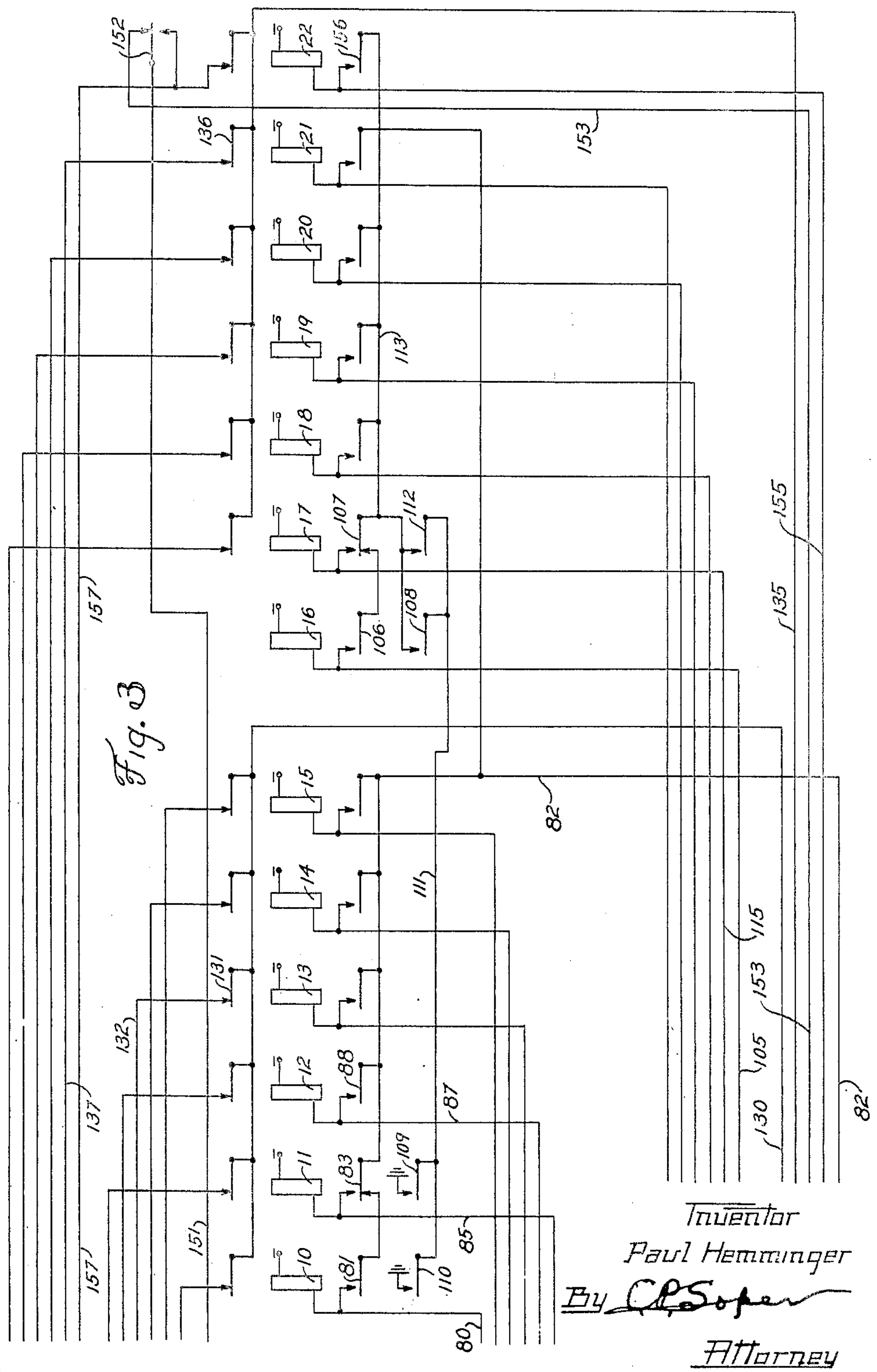

The foregoing and other features of the invention will be described more in detail hereinafter with reference to the accompanying drawings, in which Figs. 1, 2, and 3 are conventional circuit diagrams of code call apparatus embodying the invention. The several figures may be be joined by placing Fig. 2 above Fig. 1 and Fig 3 to the right of Fig. 2, with the marginally terminated conductors in alignment.

Referring to the drawings, the reference numerals 40, 41, and 42 indicate the so-called calling terminals of the code call apparatus, and are wired to multiply connected terminals in certain units of automatic switching equipment in the exchange, whereby the apparatus is rendered accessible to the subscribers. Terminals 40 and 42 are the tip and ring, or positive and negative, line terminals, while 41 is the sleeve or test terminal.

Terminals 43, 44 and 45 are the answering terminals and are accessible to the subscribers through the automatic switching equipment, like the calling terminals.

Calling and answering telephone numbers are assigned to the code call apparatus, as will be understood, and these numbers will usually have two or more digits, the number depending on the size of the system and perhaps on other factors.

The relays 23 to 34, inclusive, Fig. 1, are control relays the function and operation of which will be explained presently. Relay 38 may be a power relay for closing operating circuits for the bells which sound the code signals. There may be a number of such circuits or a number of relays such as relay 38, located on different floors or in different buildings served by the private exchange. Relays 35–37 constitute a relay interrupter or impulse generator, which transmits code impulses to the relay 38 and other similar signalling relays.

Relays 1 to 6, inclusive, Fig. 2, are counting relays, while relays 7–9 are common to the counting relays and control their energizing and locking circuits.

Relays 10 to 15 inclusive, Fig. 3, constitute a relay register on which the first digit of a code number is registered. This is the first code digit register. Relays 16 to 22, inclusive, are the relays of the second code digit register, on which the second digit of a code number is registered.

It will be noted that there are six relays in the first code digit register, which provides for registering any digit from 1 to 6. The second code digit register has seven relays, providing for registration of any digit from 1 to 7. The capacity in code numbers is equal to the product of the digits 6 and 7, or forty-two. The capacity may be varied in accordance with the requirements, by increasing or decreasing the number of relays in the registers. The maximum capacity with two registers is one hundred code numbers.

The operation of the code call apparatus will now be explained, it being assumed for this purpose that a subscriber in the private automatic exchange, hereinafter referred to as the calling subscriber, has attempted to establish connection with another party, hereinafter referred to as the called subscriber, by calling his regular telephone number, but has obtained no response and has decided to make use of the code call apparatus in order to signal the called subscriber if he is anywhere on the premises.

When the calling subscriber dials the digits of the calling telephone number assigned to the code call apparatus, the automatic switching equipment in the private automatic exchange responds in known manner and extends a connection from the calling line to the terminals 40, 41, and 42, Fig. 1. The line relay 24 accordingly energizes over the calling line and closes a circuit at front contact 50 for the slow acting release relay 23, which energizes and at contact 52 disconnects the sleeve or test terminal from negative battery and connects it to ground. This operation establishes a holding circuit for the automatic switching equipment involved in the connection and makes the code call apparatus busy to other calling subscribers. Relay 23 also prepares an impulsing circuit at contact 53 and at contact 51 prepares certain holding or locking circuits which will be mentioned later on.

Having connected with the code call apparatus in the manner explained, the calling subscriber may now dial the digits in the code number assigned to the called subscriber. It will be assumed that this code number is 35.

When the first digit 3 of the code number is dialled, the line circuit is interrupted momentarily three times and line relay 24 deenergizes three times to thereby transmit three impulses to the counting relays in Fig. 2. The first impulse is transmitted over a circuit which may be traced from ground by way of back contact 50 of line relay 24, front contact 53, conductor 54, back contact 55, conductor 56, back contacts 57, 58, and 59 of relays 7, 8, and 9, respectively, and winding of counting relay 1 to negative battery. Relay 1 energizes over the above traced circuit, at contact 60 prepares a circuit for counting relay 2, and closes a locking circuit for itself at contact 61. This locking circuit may be traced from ground by way of front contact 51 of relay 23, back contact 69, conductor 62, contact 63, conductor 64, contact 65, winding of relay 9, contact 61, and winding of relay 1 to negative battery. At the end of the first impulse relay 9 energizes over the said locking circuit in series with relay 1 and at front contact 59 transfers the impulsing circuit from relay 1 to relay 2.

The second impulse is transmitted over the same circuit as the first except that it includes front contact 59 of relay 9, contact 60, and winding of relay 2 to negative battery. Upon energizing, relay 2 prepares a circuit for relay 3 at contact 66 and completes a locking circuit for itself at contact 67, which is similar to the locking circuit previously traced for relay 1 except that it includes contact 68 of relay 7 and the winding of relay 8. At the end of the second impulse relay 8 energizes in series with relay 2, at contact 58 transfers the impulsing circuit from relay 2 to relay 3, and at contact 65 breaks the locking circuit of relay 1, whereupon relays 1 and 9 deenergize.

The third impulse is transmitted to relay 3 over the circuit prepared by relays 2 and 8 as explained. Upon energizing, relay 3 prepares a circuit for relay 4 at contact 70 and closes a locking circuit for itself at contact 71. The locking circuit includes relay 7, which energizes at the end of the third impulse and breaks the locking circuit of relay 2 at contact 68. Relays 2 and 8 accordingly deenergize.

Relay 26, Fig. 1, is the slow acting change over relay. It is connected to the impulsing circuit at conductor 54, energizes responsive to the first impulse, and remains in energized position throughout the series of impulses.

The conductors 77 and 78 are grounded at this time, having been connected to ground by the energization of the release relay 23. The circuit may be traced from ground by way of contact 51, contact 69, contact 73, and contact 74 to conductor 77, and over the same path and contacts 75 and 76 to conductor 78. The operation of counting relay 1 responsive to the first impulse of the series accordingly closes a circuit for relay 10 of the first digit register, Fig. 3, the circuit extending from the grounded conductor 77 by way of contact 79 of relay 1, conductor 80, and winding of relay 10 to negative battery. Upon energizing, relay 10 locks itself at contact 81 to conductor 82, which is grounded at this time over a circuit which extends from ground by way of contact 51 of relay 23, contact 69, and conductor 62 to conductor 82.

The operation of counting relay 2 closes a circuit for relay 11, said circuit extending from grounded conductor 78 by way of contact 84, conductor 85, and winding of relay 11 to negative battery. Upon energizing, relay 11 locks itself to grounded conductor 82 at contact 83 and also at contact 83 breaks the circuit of relay 10. The latter relay accordingly deenergizes.

The operation of counting relay 3 closes a circuit for relay 12 over a path which extends from grounded conductor 77 by way of contact 86, conductor 87, and winding of relay 12 to negative battery. Upon energizing, relay 12 locks itself to grounded conductor 82 at contact 88.

Summing up the operations so far, the first digit 3 of the code number has been dialled, relay 3 in the counting chain, Fig. 2, has been energized and is locked in series with relay 7 to conductor 64, and relays 11 and 12 of the first digit register, Fig. 3, have been energized and are locked to conductor 82. Relay 26, Fig. 1, has also been energized over the impulse circuit in parallel with the counting relays 1, 2 and 3 and has remained in operated position during the transmission of impulses, holding its contact 72 open.

At the end of the series of impulses relay 26 deenergizes and closes a circuit for the slow acting relay 34, which may be traced from ground by way of contact 51, contact 69, contact 72, contact 90, conductor 91, contact 92 of relay 7, conductor 93, and winding of relay 34 to negative battery. Upon energizing, relay 34 closes a circuit for relay 28, extending from ground by way of contact 94, back contact 95, back contact 96, and winding relay 28 to negative battery. Relay 28 accordingly energizes and closes a locking circuit for itself at contact 97. This circuit will be referred to again shortly.

When relay 34 energizes it also disconnects ground from conductor 64, thereby breaking the locking circuit of the counting relay 3. Relays 3 and 7 accordingly deenergize and the latter relay breaks the circuit of relay 34, which deenergizes also after a slight delay and breaks the initial energizing circuit of relay 28. The latter relay remains energized, however, over its previously mentioned locking circuit, which extends from ground by way of contact 51, contact 69, conductor 62, winding of relay 29, contact 98, contact 97, and winding of relay 28 to negative battery. Relay 29 energizes in series with relay 28 and at contact 96 prepares a circuit for relay 30. It should be noted also that at contact 74 relay 29 disconnects ground from conductor 77 and connects ground to conductor 103, also to conductor 102 by way of contact 101 of relay 27. Other circuit changes effected by the energization of relays 28 and 29 are not of interest at the moment, except for the separation of conductors 77 and 78 at contact 76 of relay 28, the purpose of which is to prevent any danger of false operation of a relay in the first digit register while the counting relays are responding to the second digit.

The calling subscriber may now dial the second digit 5 of the code number of the called subscriber, causing the line relay 24 to transmit a series of five impulses to the counting relays. Relay 26 responds to the first impulse and remains in energized position throughout the series of impulses, as it did during the first series. The counting relays 1, 2, and 3, also the relays 9, 8, and 7, respond to the first three impulses in the same manner as previously explained. Since there are five impulses in the second series, however, counting relays 4 and 5 also respond, as will be readily understood, and at the end of the series of impulses relay 5 remains locked to conductor 64 in series with relay 8.

The successive energization of the counting relays 1 to 5 responsive to dialling the second code digit causes the energization of certain relays in the second digit register, Fig. 3. When counting relay 1 energizes, it closes a circuit for relay 16, extending from grounded conductor 103 by way of contact 104, conductor 105, and winding of relay 16 to negative battery. Upon energizing, relay 16 connects conductors 111 and 113 at contact 108. Conductor 111 being grounded at contact 109 of relay 11 of the first register, ground is extended to conductor 113 and relay 16 locks itself to this conductor by way of its contacts 106 and back contact 107 of relay 17.

When counting relay 2 energizes, it closes a circuit for relay 17, extending from grounded conductor 102 by way of contact 114, conductor 115, and winding of relay 17 to negative battery. Upon energizing, relay 17 establishes another connection between conductors 111 and 113 at contact 112, and locks itself to conductor 113 at contact 107. Relay 17 also breaks the locking circuit of relay 16 at back contact 107, whereupon relay 16 deenergizes.

When counting relays 3, 4, and 5 energize they close circuits for relays 18, 19, and 20 respectively, which energize and lock themselves to conductor 113 in a manner which will be apparent from the drawing and will require no detailed explanation.

At the end of the second series of impulses transmitted by line relay 24, the slow acting relay 26 deenergizes and again closes the circuit of relay 34. Upon energizing, relay 34 closes a circuit for relay 30 extending from ground by way of contact 94, back contact 95, front contact 96, and winding of relay 30 to negative battery. Upon energizing over the above circuit, relay 30 establishes a locking circuit for itself at front contact 95, and at contact 98 breaks the locking circuit of relay 28. This relay and relay 29 accordingly deenergize. Relay 30 also closes a circuit for relay 27, extending from grounded conductor 62 by way of contact 117 and winding of relay 27 to negative battery. Relay 27 accordingly energizes and establishes a locking circuit for itself at contact 73.

The operation of relay 27 brings about a number of circuit changes incident to the completion of the registration of the code digits and conditioning of the apparatus for transmission of the corresponding code signals. The impulsing circuit coming from line relay 24 is opened at contact 55, which prevents sending any impulses to the counting relays by accidental operation of the calling dial. At back contact 73, ground is disconnected from contact 74 of relay 29 and conductor 77 or conductor 103, while conductors 77 and 78 and 102 and 103 are separated at contacts 75 and 101. These operations isolate the said conductors and permit the counting relays to reoperate, as they are required to do during signal transmission, without interfering with the set condition of the digit registers. At contact 119, relay 27 places negative battery on sleeve terminal 44, thereby rendering the answering terminals 43, 44, and 45 accessible to the automatic switching equipment, and at front contact 90 the relay prepares circuits for controlling the transmission of the code signals. Finally, at contact 118 relay 27 closes a circuit for relay 32, which energizes and brings about the successive energization of relays 32A and 33 in a manner which will be obvious from the drawing.

It may be recalled now that the energization of relays 27 and 30 was responsive to the energization of relay 34 and the closure of a circuit for the latter relay at contact 94. When relay 34 energizes, it also removes ground from conductor 64 at contact 63, thereby breaking the locking circuit of counting relay 5. Relays 5 and 8 accordingly deenergize and the latter relay breaks the circuit of relay 34. As previously noted, relay 34 is slow to deenergize and it maintains contact 94 closed long enough for the energization of relays 30, 27, 32, 32A, and 33 to take place as described.

When relay 34 deenergizes, it breaks the circuit of relay 32 at contact 94 and relays 32, 32A, and 33 deenergize successively, relay 32 breaking the circuit of relay 32A and the latter relay breaking the circuit of relay 33. These relays are slow to deenergize so that a time interval is introduced between the deenergization of relays 34 and 33, at the end of which a circuit is closed for relay 37, extending from ground by way of contact 51, contact 69, contact 73, contact 121, contact 122, contact 123, and winding of relay 37 to negative battery. Upon energizing, relay 37 closes a circuit for relay 35 at contact 124, and the latter relay, upon energizing, closes a circuit for relay 36 which, upon energizing in turn, breaks the circuit of relay 37. Relay 37 accordingly deenergizes and breaks the circuit of relay 35, whereupon relays 35 and 36 deenergize successively and the latter relay again closes the circuit of relay 37. The operation is repeated as described, until the initial energization circuit of relay 37 is opened by relay 34, as will be explained presently. Relay 37 preferably is slow to energize, while relays 35 and 36 are slow to release, with the result that relay 37 operates periodically at a low frequency the exact value of which depends on the characteristics of the relays and their adjustment.

Each time relay 37 energizes, it closes an energizing circuit for relay 38, which operates each time to complete ringing circuits for the bells or gongs by means of which code signals are sounded, or to operate indicators or other means which may be provided to signal the called subscriber.

Relay 37 also transmits impulses to the counting relays, Fig. 2, over a circuit which includes contact 126 and conductors 127 and 56. These impulses are similar to the digit impulses transmitted by the line relay 24, but usually will be much lower in frequency, perhaps one impulse per second or even slower. They operate the counting relays in the same way, however. The first and second impulses energize relays 1 and 2, respectively, also relays 9 and 8 but without any particular result, it being recalled that register relays 11 and 12, Fig. 3, are now energized and locked to conductor 82. When counting relay 3 is energized in response to the third impulse, it prepares a circuit at contact 128 for relay 34, and when relay 7 is energized in the locking circuit of relay 3 at the end of the impulse, the circuit is completed over a path which may be traced from ground by way of back contact 129 of relay 29, conductor 130, contact 131 of register relay 13, conductor 132, contact 128 of counting relay 3, conductor 133, back contact 134 of relay 28, front contact 90 of relay 27, conductor 91, contact 92 of relay 7, conductor 93, and winding of relay 34 to negative battery. On energizing, relay 34 breaks the circuit of relay 37 at contact 121. Relay 37 is thus prevented from energizing again and the code signalling operation by relay 38 is stopped, after three signals have been sounded or otherwise displayed. That is, relay 38 has been energized three times, corresponding to the first code digit 3.

When relay 34 energizes it also closes circuits for relays 28 and 32 at contact 94, as previously described. These relays accordingly energize, followed by the energization of relays 32A and 33. Relay 34 also breaks the locking circuit of relay 3 at contact 63, whereupon relays 3 and 7 deenergize and the latter relay breaks the circuit of relay 34 at contact 92. Relay 34 accordingly deenergizes after a momentary delay, and opens its contact 94, whereupon relay 28 becomes locked in series with relay 29 in the manner previously explained. Relay 29, upon energizing, closes a circuit for relay 31, which energizes, but without particular result at this time. At front contact 134 and 129 of relays 28 and 29, respectively, a new control circuit is prepared for relay 34.

The opening of contact 94 by the deenergization of relay 34 also breaks the circuit of relay 32, which deenergizes, followed at short intervals by the deenergization of relays 32A and 33. The latter relay upon deenergizing, again closes the circuit of relay 37. Relays 37, 35, and 36 therefore resume operations in the manner previously explained, effecting intermittent operation of code signalling relay 38 by means of contact 125 and transmitting impulses to the counting relays at contact 126.

The register relays 17 to 20 of the second digit register, Fig. 3, being energized at this time, the operation of counting relays 1 to 4, inclusive, is without effect, but the energization of relay 5 in response to the fifth impulse transmitted by relay 37 results in the preparation of a circuit for relay 34 at contact 138. The circuit is completed by the energization of relay 8 at the end of the fifth impulse and extends from ground by way of front contact 129 of relay 29, conductor 135, contact 136 of register relay 21, conductor 137, contact 138 of counting relay 5, conductor 139, front contact 90, conductor 91, contact 140 of relay 8, conductor 93, and winding of relay 34 to negative battery. Upon energizing, relay 34 opens the circuit of relay 37 at contact 121, preventing further energization of this relay and stopping the operation of relay 38 after it has been energized five times, corresponding to the second code digit 5.

When relay 34 energizes, it closes a circuit for relay 32 at contact 94 and relay 32 accordingly energizes, also relays 32A and 33. Relay 29 being energized, relay 34 also closes a circuit for relay 30 at contact 94, which energizes, locks itself at contact 95, and breaks the locking circuit of relay 28. This circuit includes relay 29 which deenergizes along with relay 28. The deenergization of these relays reestablishes the first code digit control circuit of relay 34, over conductors 130 and 133, or rather, it prepares this circuit by grounding conductor 130 and connecting conductors 133 and 91.

The energization of relay 34 also breaks the locking circuit of relay 5 and this relay and relay 8 deenergize, the latter relay breaking the energizing circuit of relay 34 at contact 140. When relay 29 deenergizes, however, it opens the circuit of relay 31 which transmits a train of impulses to relay 34 to maintain it energized for a further interval. Explaining this operation more in detail, relay 31 has a weighted armature which vibrates for several seconds when the relay is deenergized. During the vibration of the relay armature, impulses are transmitted to relay 34 over a circuit which extends from ground by way of back contact 129, conductor 141, front and back contacts of relay 31 alternately, and winding of relay 34 to negative battery. These impulses hold relay 34 energized until they eventually die out as the armature of relay 31 comes to rest.

Upon the deenergization of relay 34, it breaks the circuits of relays 30 and 32, which accordingly deenergize, followed by the deenergization of relays 32A and 33. The latter relay, upon deenergizing, closes the circuit of relay 37 at contact 122, whereupon the code signalling operation is repeated. The second operation is the same as the first and there is of course no necessity for a repetition of the explanation. The signalling operation may conveniently be summarized at this point, however, by the statement that it comprises three successive energizations of relay 38, corresponding to the first digit 3 of the code, followed by five successive energizations of the relay, corresponding to the second digit 5 of the code. Each series of energization is terminated by energization of relay 34. The interval between the two series of energizations, or between the two parts of the code, is determined by the time required for the successive deenergization of relays 34, 32, 32A, and 33, all of which are slow to deenergize. The interval between successive transmissions of the complete code is longer, since it includes the time required for the vibratory armature of relay 31 to come to rest in addition to the deenergization time of the relays.

In case it is desired to reduce the operating speed of relay 37, one or more additional slow acting relays may be inserted between relays 35 and 36. If this is done it will usually be desirable to increase the interval between the two parts of the code signal, which may be accomplished by inserting one or more additional slow acting relays between relays 32A and 33. The vibratory relay 31 is capable of adjustment to some extent, but some other known type of delay device may be used when necessary.

Continuing with the explanation, when the called subscriber hears his code signal 3—5, he proceed to the nearest or most convenient telephone and dials the answering number assigned to the code call apparatus, thereby operating automatic switching equipment to extend a connection to the answering terminals 43, 44, and 45. Upon the establishment of the connection, relay 25 is energized over the line in use, thereby disconnecting the sleeve terminal 44 from negative battery at back contact 143 and connecting it to ground at front contact 143. These operations make the answering terminals busy and establish a holding circuit for the switching equipment used by the called subscriber in extending the connection to the code call apparatus.

When relay 25 is energized over the answering line as described, it also opens its contact 69 through which ground is supplied to various holding circuits. It will be assumed, however, that the call is answered during retransmission of the code signal, perhaps for the second or third time. Relay 30 is deenergized, therefore, and the operation of relay 25 is without effect as regards opening the holding circuits because its contact 69 is shunted by back contact 117 of relay 30. Upon completion of the code signal, relay 30 is energized as previously explained and breaks the holding circuits at back contact 117, contact 69 of relay 25 being open at this time. Relay 27 and the energized register relays are accordingly deenergized and the signalling operation is terminated.

The calling and answering lines are supplied with talking battery through the windings of the relays 24 and 25, respectively, and are connected for conversation through the windings of the repeating coil, so that the calling and called subscribers may now converse as desired. When the subscribers hang up their receivers, relays 24 and 25 are deenergized, also relay 23, the holding circuits for the automatic switching equipment in use are broken, and the equipment is released. The code call apparatus is then available for use in another call.

It is believed that the operation of the code call apparatus in registering other code numbers and in operating the relay 38 to sound the corresponding code rings will be apparent from the preceding description. Some further explanation may be desirable, however, as regards code numbers such as 37, since the counting relay chain comprises only six relays.

When the first digit 3 of the code number is dialled, the operation is the same as already described and register relays 11 and 12 become energized. When the second digit 7 is dialled, seven impulses are transmitted to the counting relays by the line relay 24. Counting relays 1 to 6, inclusive, energize responsive to the first six of these impulses, causing the energization of register relays 16 to 21, inclusive. Counting relay 6 prepares a circuit for register relay 22 and this relay is energized by the seventh impulse over a circuit which includes the impulse conductor 56, contact 57, contact 150, conductor 151, back contact 152, conductor 153, contact 154 of relay 28, now energized, conductor 155, and winding of register relay 22 to negative battery. Upon energizing, relay 22 locks itself at contact 156, breaks its initial energizing circuit at back contact 152, and connects conductors 151 and 157 at front contact 152. Relay 22 thus functions as the seventh counting relay, being directly responsive to the seventh impulse.

The transmission of the first part of the code, comprising three energizations of relay 38, or three code rings, is the same as previously explained. The transmission of the second part of the code requires seven energizations of relay 38. These energizations are produced by successive operations of relay 37 in the manner previously explained, and seven impulses are transmitted to the counting relays, the first six impulses being effective to energize relays 1 to 6 in succession. Relay 6 locks itself in series with relay 7 at the end of the sixth impulse. Relay 7 energizes and prepares a circuit for energizing relay 34 responsive to the seventh impulse. This circuit is completed by relay 37 when it operates for the seventh time to energize relay 38 and extends from ground by way of contact 126, conductor 127, impulse conductor 56, front contact 57 of relay 7, contact 150 of relay 6, conductor 151, front contact 152, conductor 157, contact 158, conductor 139, front contact 134, front contact 90, conductor 91, contact 92, conductor 93, and winding of relay 34 to negative battery. Upon energizing, relay 34 opens the circuit of relay 37 at contact 121, which terminates the transmission for the second part of the code.

The invention having been described that which is believed to be new and for which the protection of Letters Patent is desired will be pointed out in the appended claim.

I claim:

In combination, a chain of counting relays, a relay register comprising relays corresponding to said counting relays, respectively, and one additional register relay, a circuit over which impulses are transmitted to operate said counting relays, circuit means whereby each counting relay can effect the energization of the corresponding register relay, and means for causing said additional register relay to energize responsive to the last impulse of a series of impulses which is greater by one than the number of counting relays, said last means comprising an extension of said impulse circuit completed by the last counting relay.

PAUL HEMMINGER.

REFERENCES CITED

The following references are of record in the file of this patent:

UNITED STATES PATENTS

| Number | Name | Date |
| --- | --- | --- |
| Re. 17,006 | Nelson | June 19, 1928 |
| 2,256,869 | Puckette | Sept. 25, 1941 |
| 2,283,395 | Strickler | May 19, 1942 |
| 2,292,183 | Wallace | Aug. 4, 1942 |